United States Patent
Piggin et al.

(10) Patent No.: US 9,094,182 B2
(45) Date of Patent: Jul. 28, 2015

(54) COMMUNICATION UNITS AND METHODS FOR RESOURCE CHANGE NOTIFICATION IN BROADCAST COMMUNICATION

(75) Inventors: Paul Piggin, Chippenham (GB); Peter Darwood, Bristol (GB); Alan Edward Jones, Calne (GB)

(73) Assignee: SCA IPLA HOLDINGS INC, New York, NY (US)

( * ) Notice: Subject to any disclaimer, the term of this patent is extended or adjusted under 35 U.S.C. 154(b) by 163 days.

(21) Appl. No.: 14/000,290

(22) PCT Filed: Feb. 17, 2012

(86) PCT No.: PCT/GB2012/050366
§ 371 (c)(1),
(2), (4) Date: Oct. 16, 2013

(87) PCT Pub. No.: WO2012/110829
PCT Pub. Date: Aug. 23, 2012

(65) Prior Publication Data
US 2014/0044071 A1 Feb. 13, 2014

(30) Foreign Application Priority Data

Feb. 18, 2011 (GB) .................................. 1102893.3
Jun. 7, 2011 (GB) .................................. 1109488.5

(51) Int. Cl.
*H04W 4/00* (2009.01)
*H04L 5/00* (2006.01)
*H04W 72/00* (2009.01)
*H04W 48/12* (2009.01)
*H04W 72/04* (2009.01)

(52) U.S. Cl.
CPC ........... *H04L 5/0096* (2013.01); *H04W 72/005* (2013.01); *H04W 48/12* (2013.01); *H04W 72/042* (2013.01)

(58) Field of Classification Search
None
See application file for complete search history.

(56) References Cited

U.S. PATENT DOCUMENTS

| 8,467,329 | B2 * | 6/2013 | Lee et al. | 370/312 |
| 2006/0029066 | A1 * | 2/2006 | Jeong et al. | 370/389 |
| 2011/0077006 | A1 * | 3/2011 | Hsu | 455/436 |

FOREIGN PATENT DOCUMENTS

| CN | 101795435 A | 8/2010 |
| CN | 101998270 A | 3/2011 |

(Continued)

OTHER PUBLICATIONS

Search Report issued Sep. 30, 2011 in United Kingdom Patent Application No. GB1109488.5.

(Continued)

*Primary Examiner* — Afshawn Towfighi
(74) *Attorney, Agent, or Firm* — Oblon, McClelland, Maier & Neustadt, L.L.P.

(57) ABSTRACT

A method for supporting cross carrier indication of a control channel change notification in a wireless communication system that provides broadcast services on a plurality of carriers. The method includes, at a base station: receiving a first message including an indication of a control channel change requirement; mapping at least one single broadcast service to a plurality of component carriers; generating a second message including a control channel change notification for the broadcast service based on the mapping; and transmitting the second message on at least one component carrier to at least one wireless communication unit.

28 Claims, 7 Drawing Sheets (56) References Cited

FOREIGN PATENT DOCUMENTS

| EP | 2 276 275 A1 | 1/2011 |
|---|---|---|
| WO | WO 2008/023928 A2 | 2/2008 |
| WO | WO 2010/032850 A1 | 3/2010 |
| WO | WO 2011/053217 A1 | 5/2011 |

OTHER PUBLICATIONS

Search Report issued Jul. 13, 2012 in United Kingdom Patent Application No. GB1102893.3.
International Search Report issued May 30, 2012 in PCT/GB2012/050366.
3GPP TSG RAN WG1, "On the support for eMBMS in Carrier Aggregation" IP Wireless Inc., R1-105687, Oct. 11-15, 2010, 3 Pages.
3GPP TSG RAN WG2, "Minimum UE capabilities for MBMS reception UEs in CA scenario" Alcatel-Lucent, R2-110141, Jan. 17-21, 2011, 2 Pages.
"3rd Generation Partnership Project, etc" 3GPP Standard, 3GPP TS 36.300, vol. 10.2.0, XP050462130, Dec. 18, 2010, 200 Pages.
3GPP TSG RAN WG1, "Remaining issues on carrier indicator field," ZTE, R1-102891, May 10-14, 2010, 3 Pages.
"3rd Generation Partnership Project, etc" 3GPP Standard, 3GPP TS 36.331, vol. 10.0.0, XP050462133, Dec. 19, 2010, 276 Pages.
"3rd Generation Partnership Project, etc" 3GPP Standard, 3GPP TS 36.213, vol. 10.0.1 XP050462385, Dec. 28, 2010, 98 pages.

\* cited by examiner

COMMUNICATION UNITS AND METHODS FOR RESOURCE CHANGE NOTIFICATION IN BROADCAST COMMUNICATION

CROSS-REFERENCE TO RELATED APPLICATIONS

The present application claims priority to British patent applications 1102893.3 filed in the U.K. on Feb. 18, 2011, and 1109488.5 filed in the U.K. on Jun. 7, 2011, the entire contents of which are hereby incorporated herein by reference.

FIELD OF THE INVENTION

The field of the invention relates to communication units and methods for resource change notification in broadcast communication. In particular, but not exclusively, the field of the invention relates to cross-carrier control channel change notification in a Long Term Evolution (LTE) $3^{rd}$ Generation Partnership Project (3GPP™) cellular communication system.

BACKGROUND OF THE INVENTION

Currently, 3rd generation cellular communication systems are being installed to further enhance the communication services provided to mobile phone users. The most widely adopted 3rd generation communication systems are based on Code Division Multiple Access (CDMA) and Frequency Division Duplex (FDD) or Time Division Duplex (TDD) technology. In CDMA systems, user separation is obtained by allocating different spreading and/or scrambling codes to different users on the same carrier frequency and in the same time intervals. This is in contrast to time division multiple access (TDMA) systems, where user separation is achieved by assigning different time slots to different users. An example of communication systems using these principles is the Universal Mobile Telecommunication System (UMTS™).

In order to provide enhanced communication services, the LTE version of 3rd generation cellular communication systems are designed to support a variety of different and enhanced services. One such enhanced service is multimedia services. The demand for multimedia services that can be received via mobile phones and other handheld devices is set to grow rapidly over the next few years. Multimedia services, due to the nature of the data content that is to be communicated, require a high bandwidth. The typical and most cost-effective approach in the provision of multimedia services is to 'broadcast' the multimedia signals, as opposed to sending the multimedia signals in an unicast (i.e. point-to-point) manner. Typically, tens of channels carrying say, news, movies, sports, etc., may be broadcast simultaneously over a communication network. Further description of LTE, can be found in Sesia, Toufik, Baker: 'LTE—The UMTS™ Long Term Evolution; From Theory to Practice', page 11. Wiley, 2009.

As radio spectrum is at a premium, spectrally efficient transmission techniques are required in order to provide users with as many broadcast services as possible, thereby providing mobile phone users (subscribers) with the widest choice of services. It is known that broadcast services may be carried over cellular networks, in a similar manner to conventional terrestrial Television/Radio transmissions. Thus, technologies for delivering multimedia broadcast services over cellular systems, such as the evolved Mobile Broadcast and Multicast Service (eMBMS) for the LTE aspect of E-UTRA, have been specified over the past few years. In these broadcast cellular systems, the same broadcast signal is transmitted over non-overlapping physical resources on adjacent cells within a conventional cellular system. Consequently, at the wireless subscriber unit, the receiver must be able to detect the broadcast signal from the cell it is connected to. Notably, this detection needs to be made in a presence of additional, potentially interfering broadcast signals, transmitted on the non-overlapping physical resources of adjacent cells.

To improve spectral efficiency, broadcast solutions have also been developed for cellular systems in which the same broadcast signal is transmitted by multiple cells but using the same (i.e. overlapping) physical resources. In these systems, cells do not cause interference to each other as the transmissions are arranged to be substantially time-coincident, and, hence, capacity is improved for broadcast services. Such systems are sometimes referred to as 'Single Frequency Networks', or 'SFNs'. In SFN systems, a common cell identifier (ID) is used to indicate those (common) cells that are to broadcast the same content at the same time. In the context of the present description, the term 'common cell identifier' encompasses any mechanism for specifying SFN operation, which may in some examples encompass a use of, say, a single scrambling code.

The LTE eMBMS feature was introduced to the 3GPP™ standard specifications in Release 9. When enabled, a wireless subscriber unit (referred to as user equipment (UE) in 3GPP™ parlance) is informed as to those subframes that have been allocated to eMBMS transmissions. The MBMS control channel (MCCH) and the MBMS traffic channel (MTCH) are multiplexed together in these subframes. The MCCH can change on a periodic basis, known as the MCCH modification period. In order to provide an efficient mechanism to notify UEs of upcoming changes to the MCCH, an MCCH change notification is transmitted in the modification period prior to the MCCH change. Thus, UEs are able to determine in advance that the MCCH information will have changed from the MCCH modification period boundary. There may be a one-to-one mapping between an MCCH and an MBSFN area; an MBSFN area is a group of cells coordinated to achieve an SFN transmission.

A MCCH change notification is contained in a physical downlink control channel (PDCCH) transmission located in an MBMS subframe. The PDCCH is located in the common search space of the PDCCH transmission space. A downlink control information (DCI) Format 1C of 8 bits is firstly padded, then a cyclic redundancy check (CRC) is added, before it is convolutionally encoded and mapped to the PDCCH. In order to distinguish this DCI from other DCI mapped to the PDCCH common search space, the CRC is scrambled by the unique MBMS radio network temporary identifier (M-RNTI).

Carrier Aggregation (CA) was introduced in Rel. 10 of the 3GPP™ standards. CA supports the aggregation of two or more component carriers (CC), up to a total of five CCs, which advantageously provide wider transmission bandwidths of, say, up to 100 MHz, for some UEs to utilise. CA allows a UE to simultaneously receive one or multiple component carriers, depending on the UE's capabilities. A UE that is capable of the aggregation of multiple component carriers can be configured to be cross-carrier scheduled, e.g. the allocation information for resources on one component carrier is transported on a different component carrier. It is also possible to aggregate a different number of component carriers of possibly different bandwidths in the uplink (UL) and the downlink (DL) channels. In typical TDD deployments, the number of component carriers and the bandwidth of each component carrier in UL and DL will be the same.

However, when a UE is not cross-carrier scheduled, then the UE is configured to read the component carrier (CC) physical downlink control channel (PDCCH) on each serving-cell in order to determine whether or not a resource allocation is present on that component carrier. If a UE is cross-carrier scheduled, a carrier indicator field (CIF) can be semi-statically configured to enable cross-carrier UL and DL assignment of frequencies for use, for example using the PDCCH in a first component carrier (CC1) to allocate a physical downlink shared channel (PDSCH) resource in a second component carrier (CC2).

When operating in an aggregated carrier mode, each UE is configured with one or more serving cells. Among these serving cells, one is designated the primary cell (Pcell) and any others are designated as secondary cells (Scells). The Pcell designation is UE-specific and certain attributes are associated with the Pcell. Each serving-cell is designed to be Release 8/9 backwards compatible.

However, the Release 10 of the 3GPP™ standard specification does not support CIF in the DCI Format 1C, as used in Release 9 eMBMS. Furthermore, eMBMS has not been discussed as part of Release 10 of the 3GPP™ standard. Therefore, no solution to supporting cross-carrier scheduling of eMBMS signalling exists, particularly in a case where a UE desiring eMBMS content is capable of carrier aggregation. In addition, within Release 10 of the 3GPP™ standard, a UE is not expected to decode the common search space on a secondary cell (Scell). Hence, amongst other factors, the LTE specification is silent on providing for MBMS control channel change notification on any carrier other than the primary carrier/cell (Pcell) (as defined for Release 9).

Figure 1:
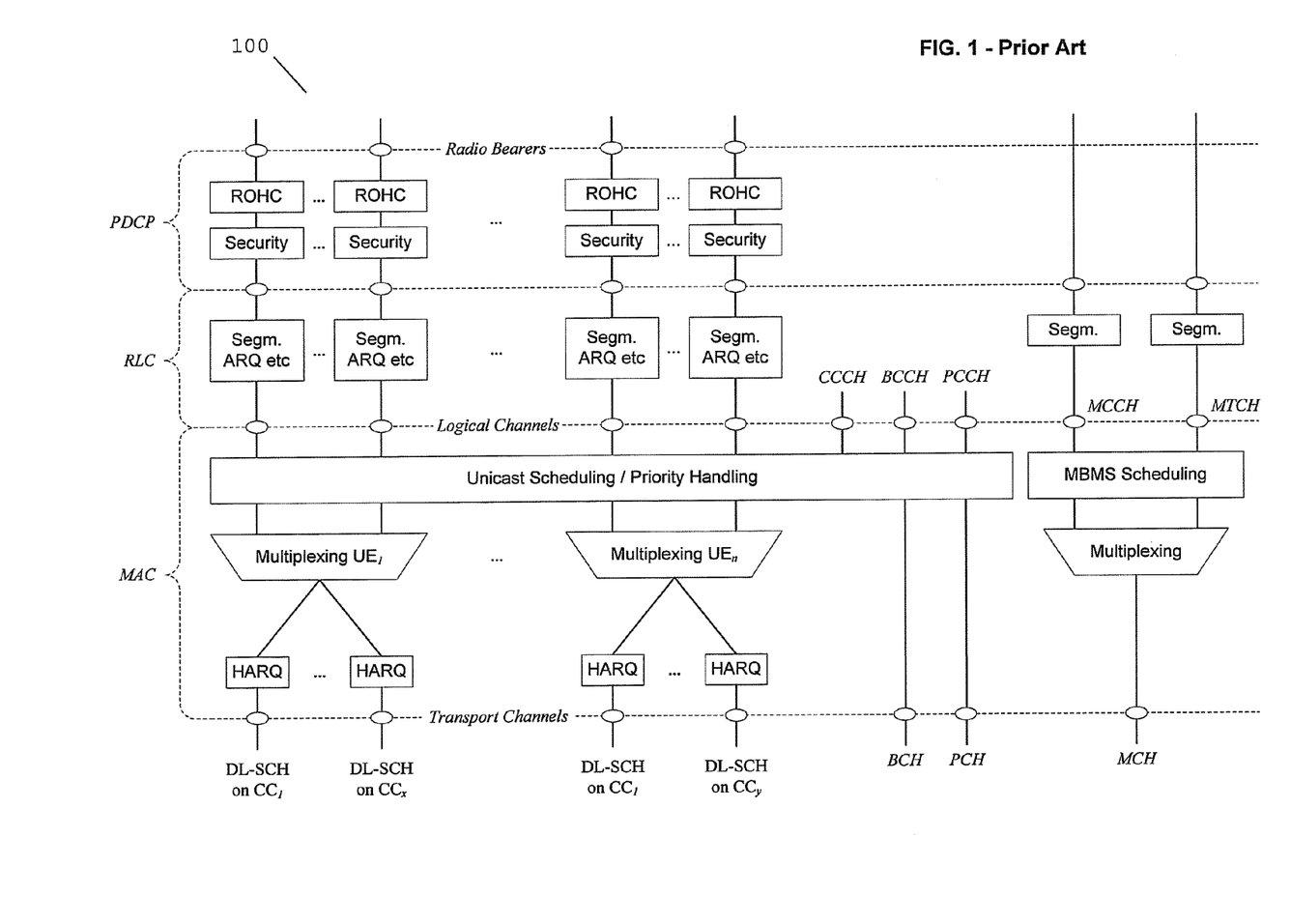
FIG. 1 illustrates a known Layer 2 downlink structure with carrier aggregation configured for LTE.

Referring now to FIG. 1, a layer-2 structure of the LTE standard of a downlink configured with carrier aggregation is shown, as disclosed in 3GPP™ specification TS 36.300. As shown, that whilst radio bearers that are mapped to DL shared transport channels can be configured for carrier aggregation (see for example component carriers 1, . . . ,x for $UE_1$), no such mapping can be configured for radio bearers that are mapped to the multicast transport channel (MCH). In Release 10 carrier aggregation, each component carrier is compatible with LTE Release 8/9. Consequently, each component carrier can carry MBMS transmissions. However, there is no mechanism for cross carrier notification or other carrier aggregation features that may be desirable to apply to MBMS.

Consequently, current techniques are suboptimal. In particular, there is no current technique to enable a single service or collection of MBMS logical channels belonging to a single MBSFN area, and hence controlled by a single MCCH, to be mapped to multiple, i.e. at least two, aggregated component carriers.

Further, there is no current technique to provide cross carrier indication of an MCCH change notification for LTE CA, for a situation where a UE is operating on a primary cell (Pcell) and is configured with at least one secondary cell (Scell).

SUMMARY OF THE INVENTION

Various aspects and features of the present invention are defined in the claims.

Embodiments of the invention seeks to mitigate, alleviate or eliminate one or more of the abovementioned disadvantages singly or in any combination.

These and other aspects, features and advantages of the invention will be apparent from, and elucidated with reference to, the embodiment(s) described hereinafter.

BRIEF DESCRIPTION OF THE DRAWINGS

Embodiments of the invention will be described, by way of example only, with reference to the accompanying drawings, in which:

FIG. 4 illustrates an example of a wireless communication unit, such as an user equipment adapted in accordance with some example embodiments of the present invention.

DETAILED DESCRIPTION OF EMBODIMENTS OF THE INVENTION

The following description focuses on embodiments of the invention applicable to a Long Term Evolution (LTE) cellular communication system and, in particular, to an LTE Radio Access Network (RAN) operating in any paired or unpaired spectrum within a $3^{rd}$ generation partnership project (3GPP™) system. However, it will be appreciated that the invention is not limited to this particular cellular communication system, but may be applied to any cellular communication system supporting broadcast communication. The following description also focuses on embodiments of the invention applicable to providing broadcast (e.g. uni-directional) services on an LTE cellular communication system, for example one supporting an evolved Mobile Broadcast and Multicast Service (eMBMS). eMBMS is a broadcasting and multicasting service offered over mobile telecommunications networks, such as the Evolved Packet System (EPS), and the like. The technical specifications for eMBMS include 3GPP™ TS 36.300.

Example embodiments described herein may be applied, for example, to provide control channel change notification on one of the component carriers of the aggregated carrier, for example in a scenario whereby eMBMS data is transported over an LTE communication system. In the examples, a skilled artisan will appreciate that the term component carrier (CC), in a context of a communication channel, may be considered in some instances as synonymous with the term serving-cell, in supporting communications to UEs residing in a geographical area, and the terms may. be used interchangeably, hereinafter.

Example embodiments propose a mechanism for MCCH change notification when carrier aggregation is applied to MBMS services.

Figure 2:
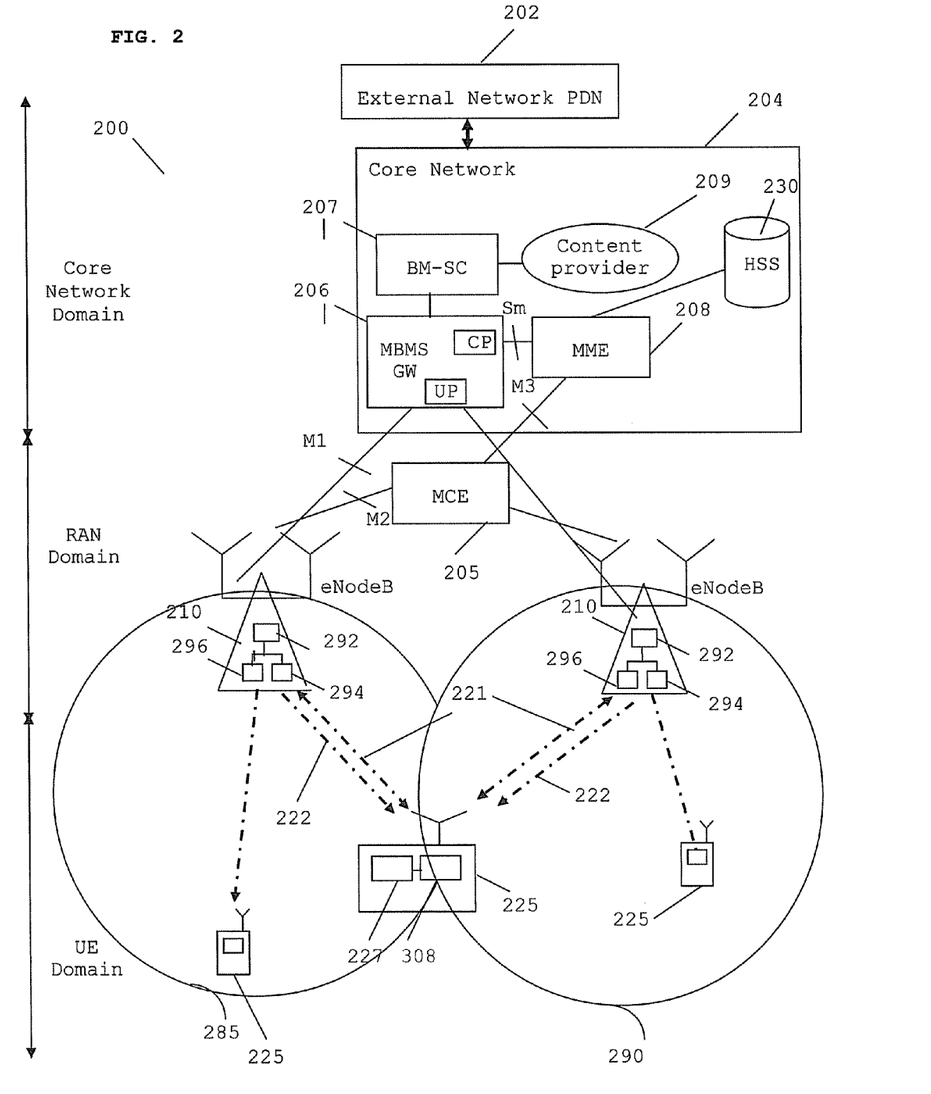
FIG. 2 illustrates a 3GPP™ LTE cellular communication system in accordance with some example embodiments of the present invention.

Referring now to FIG. 2, a wireless communication system 200 is shown in outline, in accordance with one example embodiment of the invention. In this example embodiment, the wireless communication system 200 is compliant with, and contains network elements capable of operating over, a universal mobile telecommunication system (UMTS™) air-interface. In particular, the embodiment relates to a system's architecture for an Evolved-UMTS Terrestrial Radio Access Network (E-UTRAN) wireless communication system, which is currently under discussion in the third Generation Partnership Project (3GPP™) specification for long term evolution (LTE), based around OFDMA (Orthogonal Frequency Division Multiple Access) in the downlink (DL) and SC-FDMA (Single Carrier Frequency Division Multiple Access) in the uplink (UL), as described in the 3GPP™ TS 36.xxx series of specifications. Within LTE, both time division duplex (TDD) and frequency division duplex (FDD) modes are defined. In particular, the example embodiment of the LTE system may be adapted to support broadcast E-UTRAN communication in one or more communication cells.

The wireless communication system 200 architecture consists of radio access network (RAN) and core network (CN) elements, with the core network 204 being coupled to external networks 202 (named Packet Data Networks (PDNs)), such as the Internet or a corporate network. The CN 204 comprises a broadcast media service centre (BM-SC) 207 that, in one example, is coupled to, in order to receive broadcast content, a content provider 209. The CN 204 also comprises, in this example, an evolved multicast broadcast multimedia server (MBMS) gateway (GW) 206 coupled to the BM-SC 207 and coupled to a mobility management entity (MME) 208 via an Sm interface. The MME 208 manages session control of MBMS bearers and is operably coupled to a home subscriber service (HSS) database 230 storing subscriber communication unit (UE) related information. The MBMS gateway 206 acts as a mobility anchor point and provides IP multicast distribution of the MBMS user plane data to the eNodeBs. The MBMS gateway 206 receives MBMS content via the Broadcast Multicast Service Centre (BM-SC) 207 from one or more content providers 209.

For control plane (CP) data, a MBMS co-ordination entity (MCE) 205 resides in the E-UTRAN between the MME 208 and the eNodeBs 210. The MCE 205 manages the layer-2 configurations and the use of the radio resources for broadcast transmission. Thus, the MCE 205 is a RAN domain element and can be either a separate entity (as shown) or located at the eNodeB 210. For user plane (UP) data, the BM-SC 207 is directly coupled to the eNodeBs 210 via an M1 interface.

As illustrated, the CN 204 is operably connected to two eNodeBs 210, with their respective coverage zones or cells 285, 290 and a plurality of UEs 225 receiving transmissions from the CN 204 via the eNodeBs 210. In accordance with example embodiments of the present invention, at least one eNodeB 210 and at least one UE 225 (amongst other elements) have been adapted to support the concepts hereinafter described.

The main component of the RAN is an eNodeB (an evolved NodeB) 210, which performs many standard base station functions and is connected to the CN 204 via M1 interface and to the UEs 225 via an Uu interface. A wireless communication system will typically have a large number of such infrastructure elements where, for clarity purposes, only a limited number are shown in FIG. 2. The eNodeBs 210 control and manage the radio resource related functions for a plurality of wireless subscriber communication units/terminals (or user equipment (UE) 225 in UMTS™ nomenclature).

As illustrated, each eNodeB 210 comprises one or more wireless transceiver unit(s) 294 that is/are operably coupled to a signal processor module 296 and memory 292 for storing, inter alia, information relating to broadcast service identifiers, such as, in this example. MBMS radio network temporary identifiers (M-RNTIs). In example embodiments of the invention, the signal processor module 296 is arranged to generate a message comprising a broadcast service identifier (e.g. M-RNTI), to be used to identify a control channel change (such as a MCCH change) of at least one serving cell accessible by the at least one wireless communication unit, such as UE 225. The one or more wireless transceiver unit(s) 294 communicate with the UEs 225 via a unicast channel 221 or broadcast multimedia content on a broadcast channel 222.

Each of the UEs comprise a transceiver unit 227 operably coupled to signal processing logic 308 (with one UE illustrated in such detail for clarity purposes only). The UE is illustrated as being able to receive both broadcast content on the broadcast channel 222 as well as hold unicast communications on the unicast channel 221 and communicate with the eNodeB 210 supporting communication in its respective location area. The system comprises many other UEs 225 and eNodeBs 210, which for clarity purposes are not shown.

Radio Network Temporary Identifier(s) (RNTIs) may be used, in one instance, by eNB Physical Layer (PHY) for scrambling the cyclic redundancy check (CRC) bits in each of the downlink control information (DCI) code words to be transmitted on the physical downlink control channel (PDCCH). This scrambling process in PHY happens before modulation. An RNTI is also known for MBMS systems, referred to as M-RNTI. If the PDCCH is destined for a specific UE, a UE-specific RNTI is used for the scrambling operation and the DCI is located in the UE-specific search space. If the PDCCH is destined for multiple UEs, a common RNTI is used for the scrambling operation and the DCI is located in the common search space. An M-RNTI is an example of one such common RNTI that can be used for MBMS control channel (MCCH) change notification. At the UE, the DCI formats are de-scrambled with various RNTI to ascertain the nature of the DCI contents. For instance, if a DCI Format 1C is decoded, and after de-scrambling the CRC with the M-RNTI, the all zeros sequence is obtained, and, thus, the DCI Format 1C is assumed to contain an MCCH change notification.

If a service or collection of MBMS logical channels belonging to a single MBSFN area are mapped to multiple aggregated component carriers (e.g. >1), then a number of alternative examples are described herein for the realisation of the MCCH change notification.

A first example provides a control channel change notification, for example a MCCH change notification, on a substantial number and in some instances all the component carriers of the aggregated carrier. This may provide ultimate flexibility and mean that UEs are able to decode PDCCHs with the CRC scrambled by a broadcast identifier, such as an M-RNTI in any one of the component carriers.

A second example provides the MCCH change notification on one of the component carriers of the aggregated carrier, e.g. a notification is provided on an MBSFN area basis, as opposed to a component carrier basis. This second example advantageously uses a minimal amount of control resources across the component carriers and, hence, is more spectrally efficient than the first example. Ideally, a scheduler in the RAN or CN may choose the optimum component carrier for locating the MCCH change notification PDCCH. In some examples, this may, for instance, be based upon the respective control resource utilisation on each of the component carriers. However, in this second example, the UE would have to attempt to decode PDCCHs with the CRC scrambled by the M-RNTI in all of the component carriers. Such a proposal will be acceptable for UEs currently receiving transmissions or services in those component carriers.

A third example proposes providing the MCCH change notification on one of the component carriers of the aggregated carrier, in a similar manner to the second example,. This advantageously uses the minimal amount of control resources across the component carriers and, hence, is more spectrally efficient than the first example. In the third example, the component carrier for locating the MCCH change notification PDCCH is known a priori, either through some explicit higher layer signalling, or through another pre-defined mechanism or mapping such that it is always located on the component carrier with the lowest index, for example. This approach advantageously means that a UE only has to attempt to decode PDCCHs with the CRC scrambled by the M-RNTI in one known component carrier, as opposed to all component carriers. Consequently, this third example provides a saving of power resources when compared with the second example.

A fourth example may be considered as being similar to the second example, except that instead of the component carrier carrying the MCCH change notification being arbitrarily selected (e.g. by a scheduler in the second example), the component carrier that is chosen can implicitly provide some additional information to the UE. For instance, this information may also indicate which of the component carriers the modified MCCH is transmitted on. The information carried does not have to be restricted to this example, and for instance, the MCCH change notification may be transmitted on multiple of the component carriers, signalling yet more information to the UE. Advantageously, in this fourth example, the control resource savings of the second example are maintained and additionally the UE is provided with a level of implicit signalling bandwidth.

Figure 3:
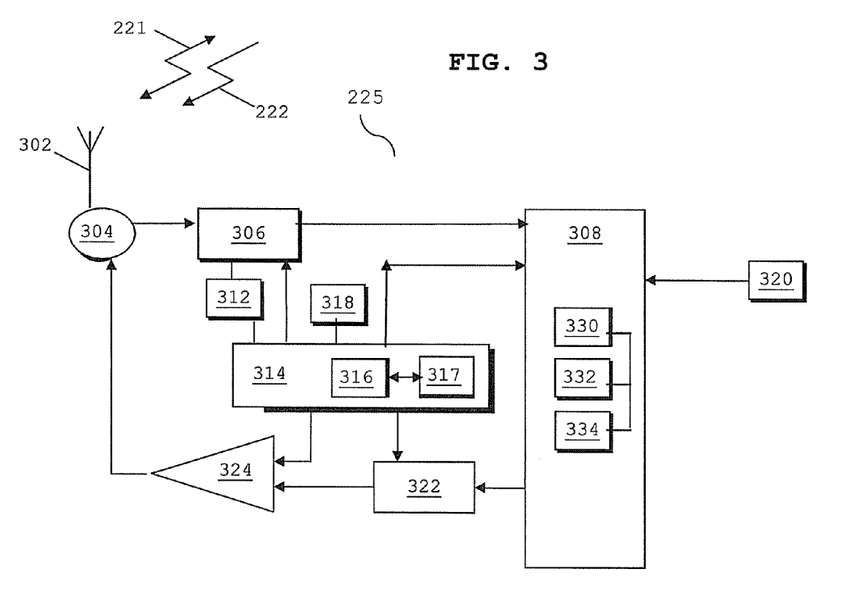
FIG. 3 illustrates an example of a wireless communication unit, such as an user equipment adapted in accordance with some example embodiments of the present invention.

Referring now to FIG. 3, a block diagram of a wireless communication unit, adapted in accordance with some example embodiments of the invention, is shown. In practice, purely for the purposes of explaining embodiments of the invention, the wireless communication unit is described in terms of a wireless subscriber communication unit such as a UE 225. The wireless communication unit 225 contains an antenna, an antenna array 302, or a plurality of antennae, coupled to antenna switch 304 that provides isolation between receive and transmit chains within the wireless communication unit 225. One or more receiver chains, as known in the art, include receiver front-end circuitry 306 (effectively providing reception, filtering and intermediate or base-band frequency conversion). The receiver front-end circuitry 306 is coupled to a signal processing module 308 (generally realised by a digital signal processor (DSP)). The one or more receiver chain(s) is/are operably configured to receive a broadcast data packet stream in one or more sub-frames over an eMBMS network. A skilled artisan will appreciate that the level of integration of using receiver circuits or components may be, in some instances, implementation-dependent.

The receiver chain includes received signal quality indicator logic or circuitry 312, which in turn is coupled to a controller 314 that maintains overall subscriber unit control. The controller 314 or signal processing module 308 may receive signal quality information, for example in a form of bit error rate (BER), frame error rate (FER) or block error rate (BLER) data, from recovered broadcast content information. The controller 314 maintains overall operational control of the wireless communication unit 225. The controller 314 is also coupled to the receiver front-end circuitry 306 and the signal processing module 308. In some examples, the controller 314 is also coupled to a buffer module 317 and a memory device 316 that selectively stores operating regimes, such as decoding/encoding functions, synchronisation patterns, code sequences, and the like. A timer 318 is operably coupled to the controller 314 to control the timing of operations (transmission or reception of time-dependent signals) within the wireless communication unit 225.

As regards the transmit chain, this essentially includes an eMBMS input module 320, coupled in series through transmitter/modulation circuitry 322 and a power amplifier 324 to the antenna, antenna array 302, or plurality of antennae. The transmitter/modulation circuitry 322 and the power amplifier 324 are operationally responsive to the controller 314. The transmitter/modulation circuitry 322 and the power amplifier 324 may be operably configured to broadcast a received eMBMS data packet stream to a plurality of UEs within coverage range of the supporting eNodeB 110.

The signal processor module 308 in the transmit chain may be implemented as distinct from the signal processor in the receive chain. Alternatively, a single processor may be used to implement a processing of both transmit and receive signals, as shown in FIG. 3. Clearly, the various components within the wireless communication unit 225 can be realized in discrete or integrated component form, with an ultimate structure therefore being an application-specific or design selection.

Figure 4:
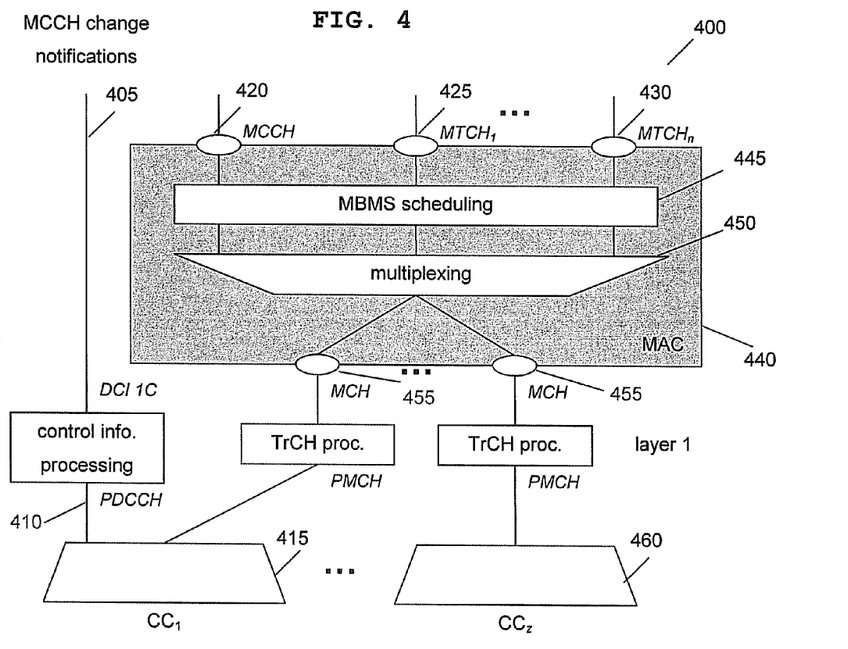
FIG. 4 illustrates an example of a mechanism to provide an MCCH change notification on one of the component carriers of the aggregated carrier in accordance with some example embodiments of the invention.

Referring now to FIG. 4, an exemplary illustration 400 of the third example is shown. Notably, in FIG. 4, the MCCH change notifications 405 that are mapped to DCI format 1C and encoded in a PDCCH are physically located in a single component carrier 415 of the carrier aggregated MBSFN area. As shown in FIG. 4, the PDCCH 410 is mapped to the control region of the first component carrier 415 in this case in accordance with the third example. In other example embodiments the PDCCH may be mapped to one or more of the component carriers in accordance with the other examples outlined herein. As shown, the MCCH 420 is multiplexed in multiplexer 450 with a plurality of MTCH 425, 430 following MBMS scheduling in scheduler 445 at a Medium Access Control (MAC) layer 440. The multiplexed channels are applied to respective Layer-1 traffic channels 455 and applied to respective CCs, 415, 460.

Figure 5:
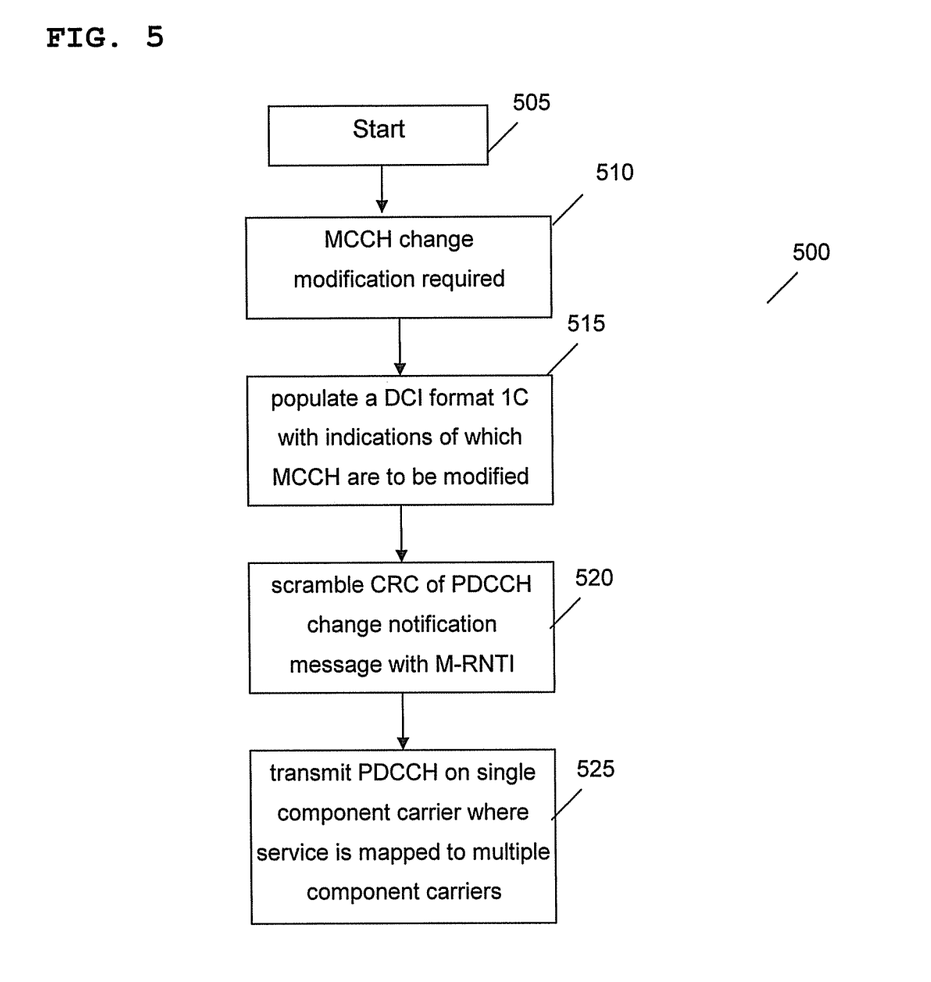
FIG. 5 illustrates an example of a flowchart employed at network element to support a control channel change notification on one of the component carriers of the aggregated carrier for broadcast communications in accordance with some example embodiments of the invention.

Referring now to FIG. 5, an example of a network element flowchart 500 for the processing of MCCH change notification indicators is illustrated to support an eNodeB operation in accordance with the aforementioned example embodiments. The eNodeB operations start at 505 and move on to 510, where the eNodeB receives a first message comprising an indication that a MBMS control channel (MCCH) change modification is required. The eNodeB then establishes which serving cell(s) the change notification applies to, and populates a DCI format 1C with indications of which MCCH are to be modified, as shown in 515. The eNodeB then generates a second message comprising a control channel change notification for the broadcast service based on the mapping. In some examples, generating the second message may comprise physically locating the second message in a single component carrier of a carrier aggregated multicast broadcast single frequency network (MBSFN) area. Additionally or alternatively, in accordance with some examples, the eNodeB may then scramble the cyclic redundancy check (CRC) of the PDCCH change notification (second) message with an appropriate broadcast service identifier (e.g. M-RNTI), as shown in 520. Advantageously, the PDCCH is then transmitted from the eNodeB on a single component carrier of the service or MBSFN area in accordance with the second, third or fourth examples, where the service is mapped to a plurality of component carriers, as shown in 525. It is not shown which of the component carriers the PDCCH is mapped to and is noted that this may implicitly provide additional signalling to the UE as outlined in the fourth example. The eNodeB then transmits the second message on at least one component carrier to at least one wireless communication unit/UE 225. In some examples, this transmission may be effected on each of the component carriers of an aggregated carrier.

In one example, the second message may comprise populating a dedicated channel indication (DCI) message format, for example a DCI format 1C message, with an indication of which control channel has been modified. In one example, populating a dedicated channel indication (DCI) message format may comprise populating a DCI message format with an indication of a multicast broadcast multimedia service (MBMS) control channel (MCCH) that has been modified. In some examples, the broadcast service identifier may be a multicast broadcast multimedia service (MBMS) radio network temporary identifier.

Figure 6:
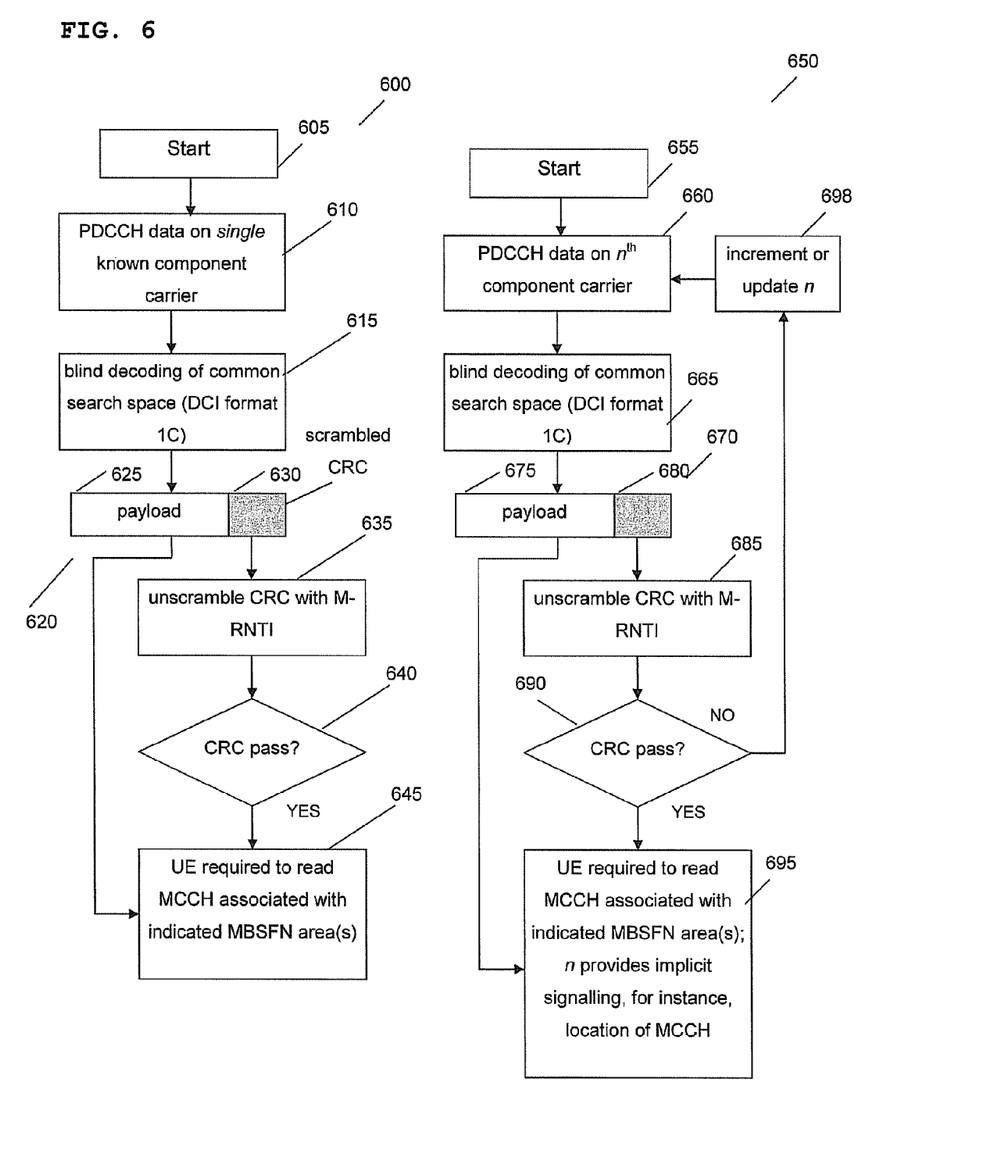
FIG. 6 illustrates an example of a flowchart employed at an user equipment to support a control channel change notification on one of the component carriers of the aggregated carrier for broadcast communications in accordance with some example embodiments of the invention.

Referring now to FIG. 6, a first example of a flowchart to support a UE operation for the processing of MCCH change notification indicators in accordance with the third example embodiment 600 and fourth example embodiment 650 is illustrated. The UE operation in the third example embodiment 600, where the UE attempts to decode the PDCCH scrambled with the M-RNTI in a single known component carrier only, starts at step 605. The UE flowchart moves on to step 610 where the UE receives a message in a common search space on at least one component carrier, for example a physical downlink control channel (PDCCH) data on a known component carrier (CC). The UE then decodes, for example performs blind decoding of downlink control information in a common search space, as shown in step 615. The UE's blind decoding produces a received data packet(s) 620 comprising a data payload 625 and a CRC value 630 that can be unscrambled. The UE then unscrambles the cyclic redundancy check (CRC) of the PDCCH data with the broadcast service identifier (e.g. M-RNTI), as shown in step 635. The UE then determines, in accordance with the third example embodiment, whether (or not) the unscrambled CRC contains all zeros, as shown in step 640. If the UE determines that the CRC does pass, in step 640, the UE is required to read the MCCH associated with the indicated one or more MBSFN area(s), as shown in step 645.

Referring now to the second UE flowchart example of FIG. 6, an example of a flowchart to support a UE operation in accordance with the fourth example embodiment is illustrated. The UE operation of the fourth example embodiment 650, where the UE attempts to decode the PDCCH scrambled with the M-RNTI on all component carriers with the location of the PDCCH implicitly signalling to the UE some further information, for instance the location of the MCCH, starts at step 655. The example flowchart moves on to step 660 where the UE receives PDCCH data on an $n^{th}$ component carrier. The UE then performs blind decoding of downlink control information in a common search space, as shown in step 665. The UE's blind decoding produces a received data packet(s) 670 comprising a data payload 675 and a CRC value 680 that can be un-scrambled. The UE then un-scrambles the cyclic redundancy check (CRC) of the PDCCH data with the broadcast service identifier (e.g. M-RNTI), as shown in step 685. The UE then determines whether (or not) the CRC contains all zeros, as shown in step 690. If the UE determines that the CRC does not pass than 'n' is incremented (or updated) in step 698 and the process loops back to step 660. If the UE determines that the CRC passes, in step 690. UE is required to read the MCCH associated with the indicated one or more MBSFN area(s), where 'n' provides an implicit signaling, for example a location of the MCCH, as shown in step 695. In some examples, whilst 650 shows a serial operation over the component carriers 'n', such an operation may be performed in parallel over all component carriers.

Thus, the UE is able to decod the message in step 615 and step 665 to recover a control channel change notification for at least one single broadcast service accessible by the UE 225 based on a mapping of the at least one single broadcast service to a plurality of component carriers; and transfer (for example in response to determining whether the de-scrambled CRC value of the downlink control information passes a test) a frequency of operation of the UE 225 to that of a serving communication cell in response to the decoded message.

Figure 7:
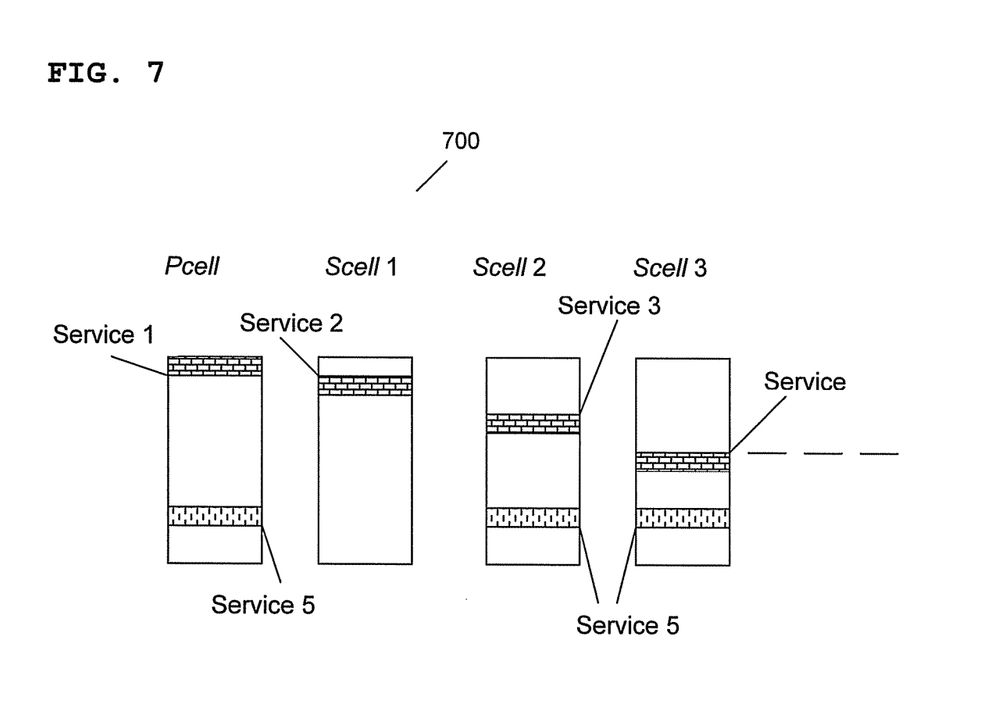
FIG. 7 illustrates an example of a simplified overview of a service-based approach to support a control channel change notification on one of the component carriers of the aggregated carrier for broadcast communications in accordance with some example embodiments of the invention.

Referring now to FIG. 7, an example of a simplified overview 700 of a service-based approach to support a control channel change notification on one of the component carriers of the aggregated carrier for broadcast communications is illustrated in accordance with some example embodiments of the invention. The simplified overview 700 illustrates how services may be distributed across the Pcell and one or more Scell(s), with various services (1, 2, 3) distributed varyingly across the communications cells, whereas service 5 is broadcast at the same points in the Pcell and SCell-2 and Scell-3.

Figure 8:
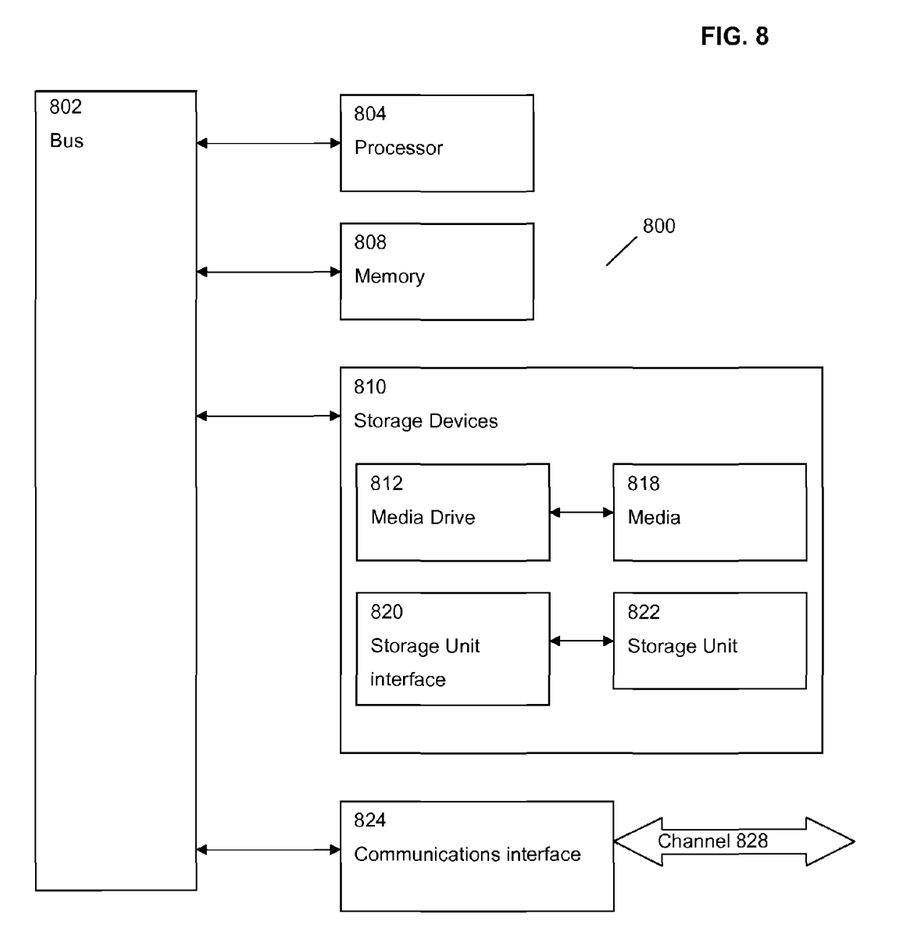
FIG. 8 illustrates a typical computing system that may be employed to implement signal processing functionality in embodiments of the invention

Referring now to FIG. 8, there is illustrated atypical computing system 800 that may be employed to implement signal processing functionality in embodiments of the invention. Computing systems of this type may be used in access points and wireless communication units. Those skilled in the relevant art will also recognize how to implement the invention using other computer systems or architectures. Computing system 800 may represent, for example, a desktop, laptop or. notebook computer, hand-held computing device (PDA, cell phone, palmtop, etc.), mainframe, server, client, or any other type of special or general purpose computing device as may be desirable or appropriate for a given application or environment. Computing system 800 can include one or more processors, such as a processor 804. Processor 804 can be implemented using a general or special-purpose processing engine such as, for example, a microprocessor, microcontroller or other control logic. In this example, processor 804 is connected to a bus 802 or other communications medium.

Computing system 800 can also include a main memory 808, such as random access memory (RAM) or other dynamic memory, for storing information and instructions to be executed by processor 804. Main memory 808 also may be used for storing temporary variables or other intermediate information during execution of instructions to be executed by processor 804. Computing system 800 may likewise include a read only memory (ROM) or other static storage device coupled to bus 802 for storing static information and instructions for processor 804.

The computing system 800 may also include information storage system 810, which may include, for example, a media drive 812 and a removable storage interface 820. The media drive 812 may include a drive or other mechanism to support fixed or removable storage media, such as a hard disk drive, a floppy disk drive, a magnetic tape drive, an optical disk drive, a compact disc (CD) or digital video drive (DVD) read or write drive (R or RW), or other removable or fixed media drive. Storage media 818 may include, for example, a hard disk, floppy disk, magnetic tape, optical disk. CD or DVD, or other fixed or removable medium that is read by and written to by media drive 812. As these examples illustrate, the storage media 818 may include a computer-readable storage medium having particular computer software or data stored therein.

In alternative embodiments, information storage system 810 may include other similar components for allowing computer programs or other instructions or data to be loaded into computing system 800. Such components may include, for example, a removable storage unit 822 and an interface 820, such as a program cartridge and cartridge interface, a removable memory (for example, a flash memory or other removable memory module) and memory slot, and other removable storage units 822 and interfaces 820 that allow software and data to be transferred from the removable storage unit 818 to computing system 800.

Computing system 800 can also include a communications interface 824. Communications interface 824 can be used to allow software and data to be transferred between computing system 800 and external devices. Examples of communications interface 824 can include a modem, a network interface (such as an Ethernet or other NIC card), a communications port (such as for example, a universal serial bus (USB) port), a PCMCIA slot and card, etc. Software and data transferred via communications interface 824 are in the form of signals which can be electronic, electromagnetic, and optical or other signals capable of being received by communications interface 824. These signals are provided to communications interface 824 via a channel 828. This channel 828 may carry signals and may be implemented using a wireless medium, wire or cable, fiber optics, or other communications medium. Some examples of a channel include a phone line, a cellular phone link, an RF link, a network interface, a local or wide area network, and other communications channels.

In this document, the terms 'computer program product' 'computer-readable medium' and the like may be used generally to refer to media such as, for example, memory 808, storage device 818, or storage unit 822. These and other forms of computer-readable media may store one or more instructions for use by processor 804, to cause the processor to perform specified operations. Such instructions, generally referred to as 'computer program code' (which may be grouped in the form of computer programs or other groupings), when executed, enable the computing system 800 to perform functions of embodiments of the present invention. Note that the code may directly cause the processor to perform specified operations, be compiled to do so, and/or be combined with other software, hardware, and/or firmware elements (e.g., libraries for performing standard functions) to do so.

In an embodiment where the elements are implemented using software, the software may be stored in a computer-readable medium and loaded into computing system 800 using, for example, removable storage drive 822, drive 812 or communications interface 824. The control logic (in this example, software instructions or computer program code), when executed by the processor 804, causes the processor 804 to perform the functions of the invention as described herein.

It will be appreciated that, for clarity purposes, the above description has described embodiments of the invention with reference to different functional units and processors. However, it will be apparent that any suitable distribution of functionality between different functional units or processors, for example with respect to the broadcast mode logic or management logic, may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Aspects of the invention may be implemented in any suitable form including hardware, software, firmware or any combination of these. The invention may optionally be implemented, at least partly, as computer software running on one or more data processors and/or digital signal processors. Thus, the elements and components of an embodiment of the invention may be physically, functionally and logically implemented in any suitable way. Indeed, the functionality may be implemented in a single unit, in a plurality of units or as part of other functional units.

Those skilled in the art will recognize that the functional blocks and/or logic elements herein described may be implemented in an integrated circuit for incorporation into one or more of the communication units. Furthermore, it is intended that boundaries between logic blocks are merely illustrative and that alternative embodiments may merge logic blocks or circuit elements or impose an alternate composition of functionality upon various logic blocks or circuit elements. It is further intended that the architectures depicted herein are merely exemplary, and that in fact many other architectures can be implemented that achieve the same functionality. For example, for clarity the signal processing module 308 has been illustrated and described as a single processing module, whereas in other implementations it may comprise separate processing modules or logic blocks.

Although the present invention has been described in connection with some example embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term 'comprising' does not exclude the presence of other elements or steps.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather indicates that the feature is equally applicable to other claim categories, as appropriate.

Furthermore, the order of features in the claims does not imply any specific order in which the features must be performed and in particular the order of individual steps in a method claim does not imply that the steps must be performed in this order. Rather, the steps may be performed in any suitable order. In addition, singular references do not exclude a plurality. Thus, references to "a", "an", "first", "second", etc. do not preclude a plurality.

The invention claimed is:

1. A method for supporting cross carrier indication of a control channel change notification in a wireless communication system that provides broadcast services on a plurality of carriers, the method comprising, at a base station:
receiving a first message comprising an indication of a control channel change requirement;

mapping at least one single broadcast service to a plurality of component carriers;
generating a second message comprising a control channel change notification for the broadcast service based on the mapping; and
transmitting the second message on at least one component carrier to at least one wireless communication unit,
wherein the control channel change notification is of a dedicated channel indication (DCI) message format having an indication of a multicast broadcast multimedia service (MBMS) control channel (MCCH) that has been modified.

2. The method of claim 1, wherein the generating the second message comprises populating the DCI message format with the indication of the MBMS MCCH that has been modified.

3. The method of claim 2, wherein the DCI message format is a DCI format 1C message.

4. The method of claim 1, wherein the generating the second message comprises scrambling a cyclic redundancy check (CRC) of the second message with a broadcast service identifier.

5. The method of claim 1, wherein the generating the second message comprises generating a physical downlink control channel (PDCCH) change notification message using a broadcast service identifier.

6. The method of claim 5, wherein the broadcast service identifier is an MBMS radio network temporary identifier.

7. The method of claim 5, wherein the generating the second message comprises physically locating the second message in a single component carrier of a carrier aggregated multicast broadcast single frequency network (MBSFN) area.

8. The method of claim 1, wherein the transmitting the second message comprises transmitting the second message on each of component carriers of an aggregated carrier.

9. The method of claim 1, wherein the at least one component carrier for locating the control channel change notification is known a priori to the at least one wireless communication unit.

10. The method of claim 9, wherein the at least one component carrier for locating the control channel change notification is known a priori to the at least one wireless communication unit through at least one from a group consisting of: explicit higher layer signaling, and a pre-defined component carrier mapping.

11. The method of claim 9, further comprising selecting the at least one component carrier such that it implicitly provides additional information to the at least one wireless communication unit.

12. The method of claim 11, wherein the additional information indicates which of the component carriers the MBMS MCCH is transmitted on.

13. The method of claim 11, wherein the selecting the at least one component carrier comprises selecting the at least one component carrier based on a control resource utilization on each of the plurality of component carriers.

14. The method of claim 1, wherein the wireless broadcast communication system supports a long term evolved (LTE) multicast broadcast multimedia service.

15. A base station for supporting cross carrier indication of a control channel change notification in a wireless communication system that provides broadcast services on a plurality of carriers, the base station comprising:
a receiver configured to receive first message comprising an indication of a control channel change requirement;
a signal processor configured to map at least one single broadcast service to a plurality of component carriers, and to generate a second message comprising a control channel change notification for the broadcast service based on the mapping; and
a transmitter operably coupled to the signal processor and configured to transmit the second message on at least one component carrier to at least one wireless communication unit,
wherein the control channel change notification is of a dedicated channel indication (DCI) message format having an indication of a multicast broadcast multimedia service (MBMS) control channel (MCCH) that has been modified.

16. An integrated circuit for a base station for supporting cross carrier indication of a control channel change notification in a wireless communication system that provides broadcast services on a plurality of carriers, the integrated circuit comprising:
an input configured to receive a first message comprising an indication of a control channel change requirement;
a signal processor configured to map at least one single broadcast service to a plurality of component carriers, and to generate a second message comprising a control channel change notification for the broadcast service based on the mapping; and
an output configured to output the second message for transmitting on at least one component carrier to at least one wireless communication unit,
wherein the control channel change notification is of a dedicated channel indication (DCI) message format having an indication of a multicast broadcast multimedia service (MBMS) control channel (MCCH) that has been modified.

17. A method for supporting cross carrier indication of a control channel change notification in a wireless communication system that provides broadcast services on a plurality of carriers, the method comprising, at the wireless communication unit:
receiving a message in a common search space on at least one component carrier;
decoding the message to recover a control channel change notification for at least one single broadcast service accessible by the wireless communication unit based on a mapping of the at least one single broadcast service to a plurality of component carriers; and
transferring a frequency of operation of the wireless communication unit to that of a serving communication cell in response to the decoded message,
wherein the control channel change notification is of a dedicated channel indication (DCI) message format having an indication of a multicast broadcast multimedia service (MBMS) control channel (MCCH) that has been modified.

18. The method of claim 17, wherein the receiving a message on at least one component carrier comprises receiving a physical downlink control channel (PDCCH) data on the at least one component carrier (CC).

19. The method of claim 17, wherein the decoding the message comprises:
performing blind decoding of downlink control information in a common search space; and
producing a received data packet comprising a data payload and a cyclic redundancy check (CRC) value.

20. The method of claim 19, further comprising de-scrambling the CRC value of the downlink control information with a broadcast service identifier, or with a multicast broadcast radio network temporary identifier (M-RNTI).

21. The method of claim 19, wherein the downlink control information comprises physical downlink control channel (PDCCH) data.

22. The method of claim 19, further comprising determining whether the de-scrambled CRC value of the downlink control information passes a test, and upon passing the test transferring to a notified main control channel.

23. The method of claim 17, wherein the decoding the message comprises decoding the message on all component carriers such that the decoded message implicitly signals additional information to the wireless communication unit, or a location of a main control channel of the identified control channel change.

24. The method of claim 17, wherein the decoding the message comprising the broadcast service identifier comprises decoding the DCI message with the indication of the MBMS MCCH that has been modified that is accessible by the wireless communication unit.

25. The method of claim 17, wherein the wireless communication system supports a Long Term Evolved (LTE) multicast broadcast multimedia service.

26. A wireless communication unit, for supporting cross carrier indication of a control channel change notification in a wireless communication system that provides broadcast services on a plurality of carriers, the wireless communication unit comprising:
   a receiver configured to receive a message in a common search space on at least one component carrier;
   a signal processor operably coupled to the receiver and configured to decode the message to recover a control channel change notification for at least one single broadcast service accessible by the wireless communication unit based on a mapping of the at least one single broadcast service to a plurality of component carriers, and to transfer a frequency of operation of the wireless communication unit to that of a serving communication cell in response to the decoded message,
   wherein the control channel change notification is of a dedicated channel indication (DCI) message format having an indication of a multicast broadcast multimedia service (MBMS) control channel (MCCH) that has been modified.

27. An integrated circuit for a wireless communication unit for supporting cross carrier indication of a control channel change notification in a wireless communication system that provides broadcast services on a plurality of carriers, the integrated circuit comprising:
   a receiver configured to receive a message in a common search space on at least one component carrier;
   a signal processor operably coupled to the receiver and configured to decode the message to recover a control channel change notification for at least one single broadcast service accessible by the wireless communication unit based on a mapping of the at least one single broadcast service to a plurality of component carriers, and to transfer a frequency of operation of the wireless communication unit to that of a serving communication cell in response to the decoded message,
   wherein the control channel change notification is of a dedicated channel indication (DCI) message format having an indication of a multicast broadcast multimedia service (MBMS) control channel (MCCH) that has been modified.

28. A broadcast wireless communication system comprising a base station for supporting cross carrier indication of a control channel change notification in the broadcast wireless communication system arranged to provide broadcast services on a plurality of carriers, to at least one wireless communication unit, the base station comprising:
   a receiver configured to receive a first message comprising an indication of a control channel change requirement;
   a signal processor configured to map at least one single broadcast service to a plurality of component carriers, and to generate a second message comprising a control channel change notification for the broadcast service based on the mapping; and
   a transmitter operably coupled to the signal processor and configured to transmit the second message on at least one component carrier to at least one wireless communication unit,
   wherein the wireless communication unit comprises:
   a receiver configured to receive a message in a common search space on at least one component carrier;
   a signal processor operably coupled to the receiver and configured to decode the message to recover a control channel change notification for at least one single broadcast service accessible by the wireless communication unit based on a mapping of the at least one single broadcast service to a plurality of component carriers, and to transfer a frequency of operation of the wireless communication unit to that of a serving communication cell in response to the decoded message,
   wherein the control channel change notification is of a dedicated channel indication (DCI) message format having an indication of a multicast broadcast multimedia service (MBMS) control channel (MCCH) that has been modified.

* * * * *